(No Model.)
O. OHLSSON.
CENTRIFUGAL SEPARATING MACHINE.
No. 575,727.  Patented Jan. 26, 1897.
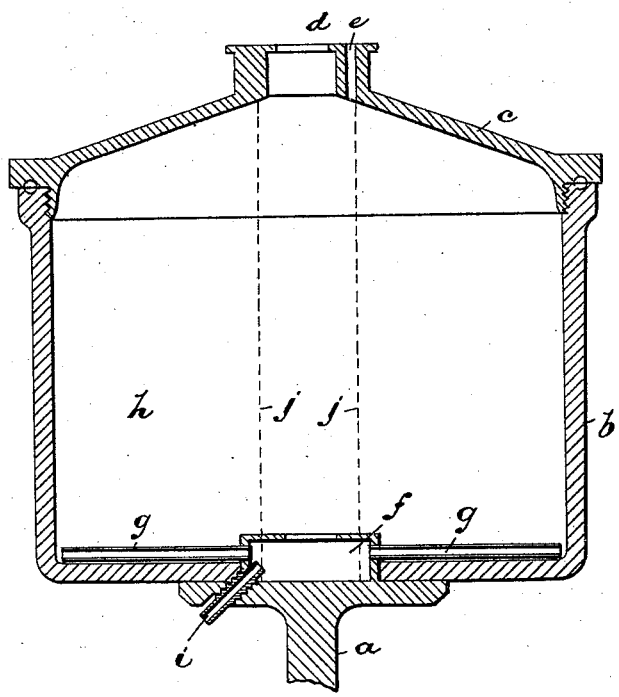
Witnesses
Robert Sollberger
Louisa Browne
Inventor
Olof Ohlsson,
By Draker & Co, Atty's.

UNITED STATES PATENT OFFICE.

OLOF OHLSSON, OF NEWARK, NEW JERSEY.

CENTRIFUGAL SEPARATING-MACHINE.

SPECIFICATION forming part of Letters Patent No. 575,727, dated January 26, 1897.

Application filed February 19, 1894. Serial No. 500,627. (No model.)

*To all whom it may concern:*

Be it known that I, OLOF OHLSSON, a citizen of the United States, residing at Newark, in the county of Essex and State of New Jersey, have invented certain new and useful Improvements in Centrifugal Separating-Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to certain specific features of improvement for service more particularly in that class of centrifugal separating-machines represented by the one shown in my Patent No. 519,070, granted May 1, 1894, for a centrifugal creamer, for which the application was filed January 21, 1893, the object of the present improvement being to more exactly regulate the outflow of skim or blue milk and the proportion of the same in the cream with increased convenience, ease, and facility.

The invention consists in the construction hereinafter set forth.

Referring to the accompanying figure of the drawing, showing a bowl and cover of a centrifugal separating-machine in central vertical section, $a$ indicates a rotary shaft of any suitable construction and operated in any manner convenient. $b$ is the bowl carried by the same, and $c$ is the cover secured to said bowl and having the milk-inlet aperture $d$ and cream-outlet $e$, formed and arranged as heretofore. At the bottom of the bowl, at the center, is formed a blue or skim milk chamber $f$, having ducts or passages $g$ $g$, leading thereto from near the periphery of the interior chamber $h$ for transferring the blue milk to said chamber $f$. Leading outward from said chamber $f$ is an eduction-tube forming the blue-milk-outlet port $i$, which is adjustably arranged in bearings in the base of the bowl, inclined to the axis of the same so that the tubular and threaded eduction-screw will extend upwardly and inwardly into a blue-milk chamber at the lower central part of the interior of the bowl. The outward lower end of the threaded eduction-tube arranged in said inclined bearings projects so as to admit of easy manipulation and adjustment. The inner end of the inclined adjustable eduction-tube lies at or nearly at the vertical line of the cream wall, (indicated by the broken lines $j$ and formed by the cream-eduction opening or passage $e$,) and thus by changing the relation of said inner end to said line of the cream wall the proportion of blue milk in the cream as it flows outward may be regulated and largely controlled.

By inclining the threaded eduction-tube as shown a single turn or portion of a turn of the tube in its bearings has less effect in throwing the inner end to or from the line of the cream wall, and thus adjustment may be secured with greater nicety, as will be understood.

In operating the device by turning the screw inward toward the line of the cream wall the pressure on the outflowing blue milk will be reduced and its outflow lessened, as will be apparent, and, as a result, a larger proportion of blue milk is forced into the cream. A reverse movement of the screw toward the periphery is the occasion of a more rapid outflow of blue milk therethrough, and thus a thicker and harder cream wall is formed. A small percentage of the blue milk in the cream is ordinarily desirable, inasmuch as the said blue milk gives increased fluidity to the cream.

The interior of the bowl may be provided with partitions or similar means for more rapidly separating the cream from the blue milk in any suitable manner. No such partitions are shown, as they do not form particularly the subject of this invention.

While I have shown and described my invention as embodied in the form which now appears to me the best, it is to be understood, of course, that various changes in the parts and in their relation might be made without departing from the spirit of the invention. For example, other means than the ducts $g$ and the chamber $f$ might be employed for conducting the blue milk from near the periphery to the outlet-port $i$, and these means, together with the outlet-port, might be in the top as well as in the bottom of the bowl.

Having thus described the invention, what I claim as new is—

1. In a centrifugal separating-machine, the combination with the rotary separating-bowl of means for guiding the blue milk from near the periphery of the bowl toward the axial line thereof, and an inclined tubular screw seated in the bowl and forming a blue-milk-outlet port communicating with the interior of the bowl near its axial line where the blue milk is delivered from the periphery, substantially as set forth.

2. In a centrifugal separating-machine, the combination with the rotary separating-bowl, of an outlet-port for the blue milk comprising an inclined tubular screw seated in the bowl and communicating with the interior thereof near its axial line, and one or more ducts for the blue milk leading from near the periphery of the bowl to said outlet-port, substantially as set forth.

3. In a centrifugal separating-machine, the combination with the rotary separating-bowl having, at the bottom, a blue-milk chamber, $f$, and a duct for blue milk leading from the outer or peripheral portion of the bowl into said chamber, of an inclined, adjustable and tubular or hollow screw, $i$, seated in threaded bearings of said bowl and extending from the outside of the bowl upward and inward into said blue-milk chamber, substantially as set forth.

In testimony that I claim the foregoing I have hereunto set my hand this 16th day of February, 1894.

OLOF OHLSSON.

Witnesses:
CHARLES H. PELL,
LOUISA BROWNE.